United States Patent
Tan et al.

(10) Patent No.: US 7,317,447 B2
(45) Date of Patent: Jan. 8, 2008

(54) POINTING DEVICE WITH ADAPTIVE ILLUMINATION LEVEL

(75) Inventors: Shan Chong Tan, Selangor (MY); Lye Hock Bernard Chan, Penang (MY); Tong Sen Liew, Perak (MY)

(73) Assignee: Avago Technologies ECBU ID (Singapore) Pte Ltd, Singapore (SG)

(*) Notice: Subject to any disclaimer, the term of this patent is extended or adjusted under 35 U.S.C. 154(b) by 482 days.

(21) Appl. No.: 10/720,465

(22) Filed: Nov. 21, 2003

(65) Prior Publication Data
US 2005/0110776 A1 May 26, 2005

(51) Int. Cl.
*G09G 5/00* (2006.01)
(52) U.S. Cl. ............... 345/166; 345/163; 345/156
(58) Field of Classification Search ........ 345/156–167, 345/184; 250/221, 204, 205, 208.1
See application file for complete search history.

(56) References Cited

U.S. PATENT DOCUMENTS

| | | | | |
|---|---|---|---|---|
| 5,574,480 A | * | 11/1996 | Pranger et al. | 345/166 |
| 5,608,339 A | * | 3/1997 | Fujiwara | 326/27 |
| 6,172,354 B1 | * | 1/2001 | Adan et al. | 250/221 |
| 6,496,180 B1 | * | 12/2002 | Hedman | 345/166 |
| 6,585,158 B2 | * | 7/2003 | Norskog | 235/462.13 |
| 2002/0139918 A1 | * | 10/2002 | Jung et al. | 250/205 |
| 2002/0190953 A1 | | 12/2002 | Gordon et al. | |
| 2004/0129861 A1 | | 7/2004 | Jung et al. | |
| 2004/0160411 A1 | | 8/2004 | Yang | |

FOREIGN PATENT DOCUMENTS

| | | |
|---|---|---|
| EP | 1 096 778 | 2/2001 |
| JP | 2004302533 | 10/2004 |

* cited by examiner

*Primary Examiner*—Duc Q Dinh

(57) ABSTRACT

A pointing device and method for operating the same is disclosed. The pointing device includes an illumination system, a camera system, and a controller. The illumination system illuminates a surface over which the pointing device moves. The illumination system generates a light level determined by an illumination control signal. The camera records a plurality of images of the illuminated surface. The controller records first and second images taken by the camera at different times and determines a displacement indicative of the direction and distance the positioning device moved between the two different times. The controller also generates the illumination control signal. The illumination control signal depends on at least one of the images recorded by the camera system. In one embodiment, the surface is characterized by a reflectivity and the light level generated by the illumination system is inversely related to that reflectivity.

20 Claims, 3 Drawing Sheets

POINTING DEVICE WITH ADAPTIVE ILLUMINATION LEVEL

FIELD OF THE INVENTION

The present invention relates to computer pointing devices, and more particularly, to an improved optical mouse.

BACKGROUND OF THE INVENTION

A common form of pointing device for use with computers and the like is referred to as a "mouse". The computer user moves the device over a surface to move a cursor on the computer screen. The amount of motion and the direction of motion of the mouse are sensed by the device and determine the distance and direction in which the cursor moves on the screen. Inexpensive mice based on a ball that rolls over the surface have been used for some time. The ball turns two cylinders that sense the distance and direction of motion. Unfortunately, the ball picks up grease and other dirt from the surface and transfers this material to the cylinders. The resulting coating on the cylinders interferes with the motion of the cylinders, and hence, the devices must be cleaned periodically. The cleaning operation is awkward and time consuming.

Mice based on optical sensing avoid this problem. Originally, such mice had to be moved over a special pad that had grid lines that were sensed by the device. The need to use this special pad made these devices less attractive than the mechanical mice discussed above. Recently, optical mice that do not require such pads have been developed. These mice include a light source that illuminates the surface under the mouse at a shallow angle, which accentuates the structural details of the surface. An image sensor in the mouse records an image of the illuminated surface periodically. By comparing two successive images, the displacement of the mouse between the times at which the images were taken can be determined.

Wireless optical mice are particularly attractive since the user is not constrained by a cable connecting the pointing device to the computer. Battery life is an important consideration in such systems both from the standpoint of operating cost and convenience. Hence, systems with reduced power demands are of particular value.

SUMMARY OF THE INVENTION

The present invention includes a pointing device and method for operating the same. The pointing device includes an illumination system, a camera system, and a controller. The illumination system illuminates a surface over which the pointing device moves. The illumination system generates a light level determined by an illumination control signal. The camera records a plurality of images of the illuminated surface. The controller records first and second images taken by the camera at different times and determines a displacement indicative of the direction and distance the positioning device moved between the two different times. The controller also generates the illumination control signal. The illumination control signal depends on at least one of the images recorded by the camera system. In one embodiment the surface is characterized by a reflectivity, the light level generated by the illumination system is inversely related to that reflectivity. In another embodiment, the illumination system includes an LED and a variable current circuit that adjusts the current flowing through the LED in response to the illumination control signal. In another embodiment, the variable current circuit includes a current mirror for controlling current in the LED. In yet another embodiment, the illumination system has a first illumination setting for providing a first level of accuracy in the determined displacement and a second illumination setting for providing a second level of accuracy that is greater than the first level of accuracy. The second illumination setting requires more power than the first illumination setting.

DETAILED DESCRIPTION OF THE PREFERRED EMBODIMENTS OF THE INVENTION

Figure 1:
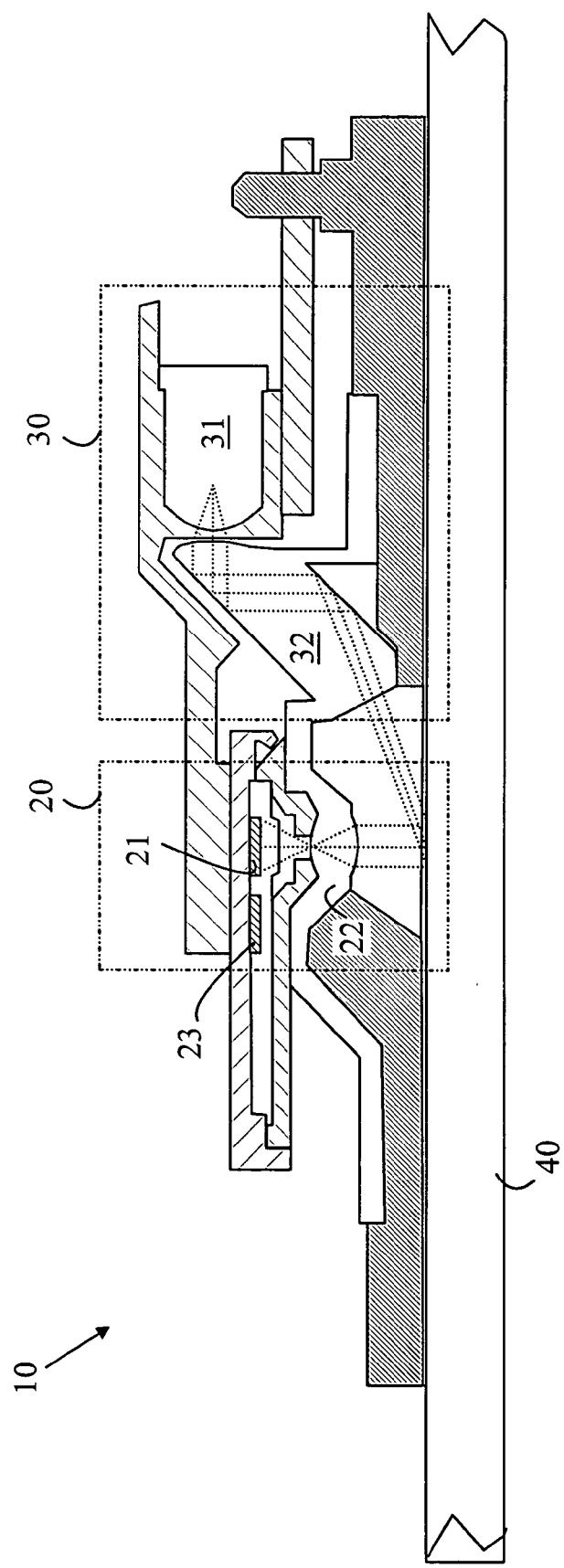
FIG. 1 is a simplified cross-sectional view of an optical mouse.

The manner in which the present invention provides its advantages can be more easily understood with reference to FIG. 1 which is a simplified cross-sectional view of an optical mouse 10 over a substrate 40. Mouse 10 may be viewed as having two principal components, an illumination section 30 and an imaging section 20. Illumination section 30 typically includes an LED light source 31 and an optical assembly 32 that illuminates surface 40 with collimated light that strikes the surface at a shallow angle relative to the surface. Light from the illuminated portion of the surface is imaged by the imaging section onto a sensor 21 with the aid of a lens assembly 22. Sensor 21 is a two-dimensional array of imaging elements that forms an image of a portion of surface 40.

When the mouse is moved relative to the surface, the image shifts on sensor 21. If images are taken sufficiently close together in time, each successive image will contain a portion of the previous image. Hence, by comparing two successive images, mouse 10 can determine the offset between the images. For example, mouse 10 can compute the correlation of the first image shifted by various amounts with the second image. The shift that provides the highest correlation is assumed to be the displacement of the mouse during the period of time that elapsed between the times at which the two images were taken. In the embodiment shown in FIG. 1, it is assumed that a controller 23 performs the displacement computations and outputs a signal indicative of the motion. However, embodiments in which the image is output to a computer attached to the optical mouse can also be constructed.

The present invention is based on the observation that the power consumed by the LED in the light source is the greatest power drain, and hence, a more efficient illumination system would provide increased battery life. Prior art devices utilize a fixed LED current regardless of the reflectivity of the surface over which the pointing device moves. In general, the tracking performance of an optical mouse on dark surfaces is less than the performance on light surfaces, as the system requires a longer exposure time to capture the underlying images. Hence, the frame rate on surfaces having low reflectivity is lower than the frame rate on surfaces having higher reflectivity. Accordingly, the LED current in prior art devices is set sufficiently high to provide a satisfactory frame rate even on dark surfaces. This further taxes the available battery life in wireless systems.

Figure 2:
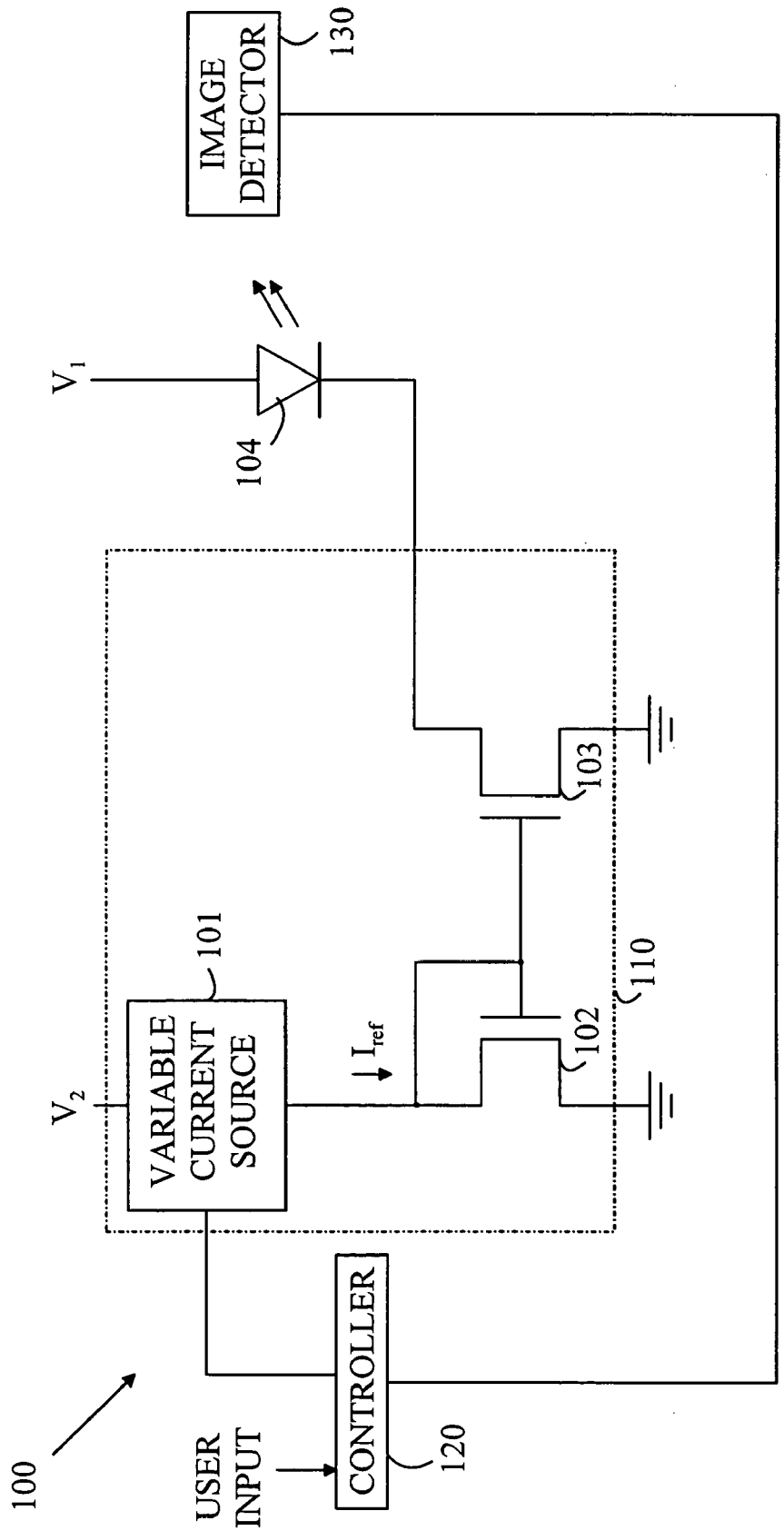
FIG. 2 is a schematic drawing of an optical mouse according to one embodiment of the present invention.

The present invention overcomes this flaw by utilizing an adaptive LED current source that automatically determines the optimum light intensity level based on the real-time surface image information captured by the imaging system. That is, surfaces with higher reflectivity are illuminated with a lower light level than surfaces with lower reflectivity. As a result, the power utilized on high reflectivity surfaces is reduced. Refer now to FIG. 2, which is a schematic drawing of an optical mouse 100 according to one embodiment of the present invention. Optical mouse 100 utilizes an LED 104 to illuminate the surface under optical mouse 100. The illuminated surface is imaged by an imaging detector 130 that is analogous to optical assembly 32 discussed above. The image from image detector 130 is processed by a controller 120, which compares successive frames taken by image detector 130 to determine the amount and direction of motion of optical mouse 100 between the frames.

The light level generated by LED 104 is determined by the current flowing through LED 104. This current is set by an LED drive circuit 110. Drive circuit 110 includes a variable current source 101 whose output is determined by a control signal generated by controller 120. The current from variable current source 101 is applied to transistors 102 and 103 that are connected in a current mirror configuration. Accordingly, the current flowing through transistor 103, and hence, LED 104, is proportional to the current generated by variable current source 101.

In one exemplary embodiment, controller 120 sets the current through LED 104 by examining the contrast obtained in the images from image detector 130. In the simplest embodiment, controller 120 measures the average light intensity received across all of the pixels in the image formed by image detector 130. If the average intensity is less than a first predetermined threshold value, the light level generated by LED 104 is increased by increasing the output current of variable current source 101. Similarly, if the average intensity is greater than a second predetermined threshold, the light intensity generated by LED 104 is reduced.

Other algorithms for setting the current level through LED 104 can be utilized. For example, controller 120 can compare the intensities of the brightest and weakest pixels in the images from image detector 130, and adjust the current to provide a predetermined ratio between the brightest and weakest pixel values.

In yet another example, the current level through the LED is set by comparing the results of the image comparisons. As noted above, optical mouse 100 operates by comparing successive images to determine the direction and amount of motion that has occurred between the successive images. This comparison is typically carried out by computing the correlation of a first image with a second image after the second image has been displaced with respect to the first image. When the magnitude and direction of the displacement matches that of the optical mouse on the surface, the correlation will have a maximum value. The magnitude of the maximum correlation value is a measure of the certainty of the displacement measurement. This maximum value, in general, depends on the contrast in the images from image detector 130, which, in turn, depends on the light output from LED 104. In general, the performance of the tracking algorithm will not improve substantially after the correlation value reaches some threshold value. Hence, the current through LED 104 can be set to provide a correlation value that is greater than some predetermined threshold value.

Figure 3:
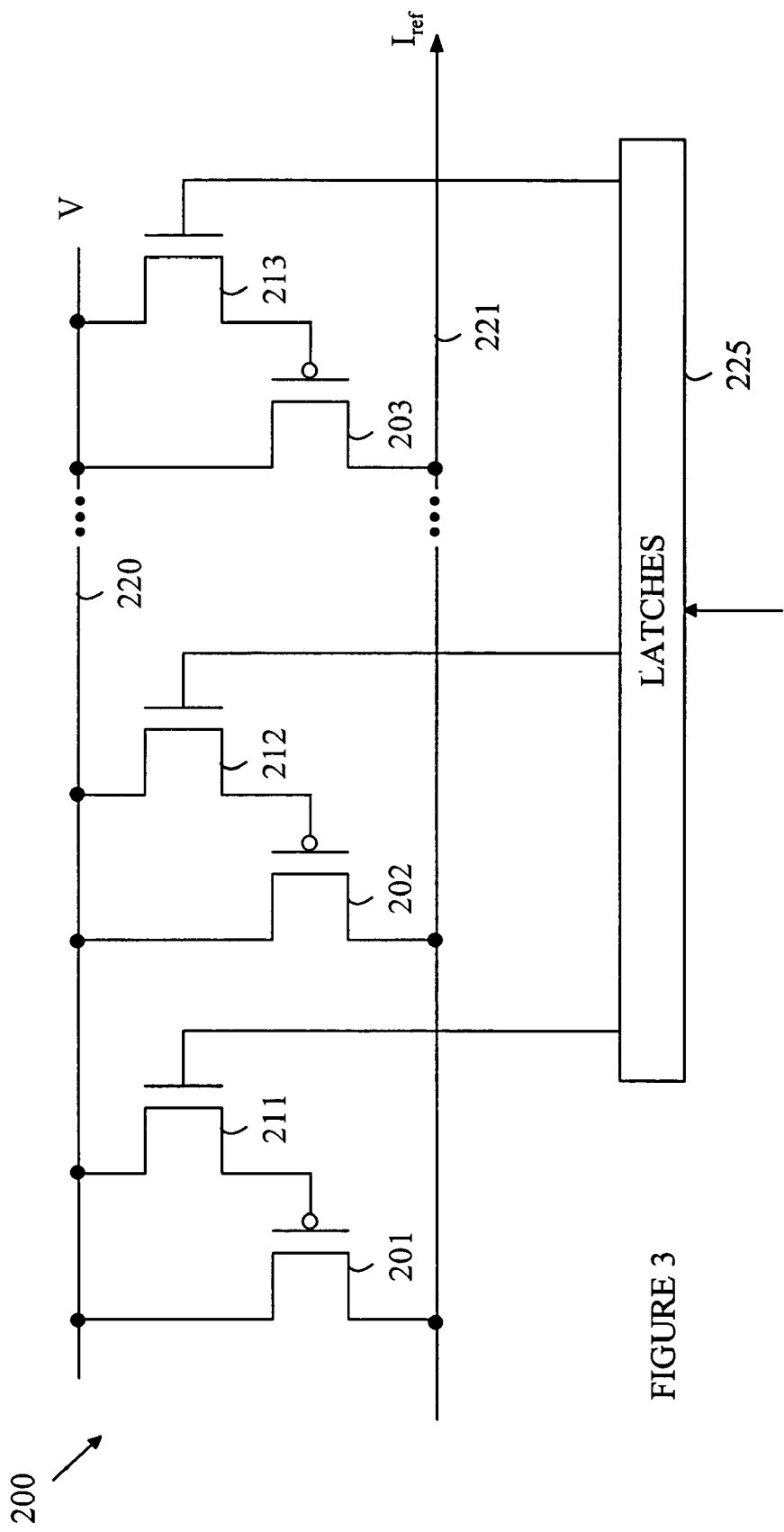
FIG. 3 illustrates a variable current source for use in the present invention.

The above-described embodiments utilize a variable current source to set the current in one branch of a current mirror. Variable current sources are known in the art, and hence, will not be discussed in detail here. For the purposes of this discussion, it is sufficient to note that such a source can be constructed by connecting a plurality of transistors in parallel and selectively setting the transistors that are held in the conducting state. Refer now to FIG. 3, which illustrates a variable current source 200 that operates in this manner. Current source 200 includes a plurality of transistors connected between a power bus 220 and a reference current line 221. Exemplary transistors are shown at 201–203. Transistors 201–203 are controlled by control signals that are applied to transistors 211–213, respectively. These switching transistors are controlled, in turn, by a set of latches 225 whose state is determined by control signals generated by the controller in the optical mouse.

When a current transistor is in the conducting state, the current supplied by that transistor is proportional to the width of the channel region of the transistor. Hence, if all of the transistors have the same width, the current supplied on line 221 will be K times the current supplied by one transistor, where K is the number of current transistors in the conducting state. The arrangement shown in FIG. 3 can also be utilized to construct a binary coded current source by utilizing current transistors that have widths that differ from one another by factors of two. Such an arrangement is preferred, since fewer transistors are required to provide any given step size.

The above-described embodiments of the present invention have utilized a particular current driver design for varying the current through the LED in the optical mouse. However, the present invention is not limited to this particular form of driving circuit. Any circuit that allows the controller to vary the light level generated by the illumination subsystem of the optical mouse can be utilized.

The above-described embodiments have been described in terms of regulating the light output of the illumination sub-system to provide an optimal level of performance. However, embodiments in which the optical mouse has two modes requiring different power levels can also be constructed. In this case, the first mode is a low power "economic mode" that provides longer battery life, while the second mode is a "high performance" mode that requires a higher power level but provides increased performance. The second mode, for example, would be better suited to the inputting of graphical information, which often requires a higher degree of precision and faster tracking times. The specific mode that is operative at any given time is preferably determined by a control signal supplied by a user. The control signal can be generated by the driver on the device utilizing the pointing device or by a switch on the pointing device itself. For example, the controller shown in FIG. 2 has an input port for receiving such user commands.

The above-described embodiments of the present invention have utilized an illumination source based on an LED; however, other light sources can be utilized. For example, the surface can be illuminated by a laser diode, infra red light source, or incandescent light source.

Various modifications to the present invention will become apparent to those skilled in the art from the foregoing description and accompanying drawings. Accordingly, the present invention is to be limited solely by the scope of the following claims.

What is claimed is:

1. A pointing device comprising:
   an illumination system that illuminates a surface over which said pointing device moves, said illumination system generating a light level determined by an illumination control signal;
   a camera system that records a plurality of images of said illuminated surface; and
   a controller that records first and second images captured by said camera at different times and determines a displacement indicative of the direction and distance said positioning device moved between said two different times, said controller further generating said illumination control signal, said illumination control signal depending on at least one of said images recorded by said camera system;
   wherein said illumination system has a first illumination setting for providing a first level of accuracy in said determined displacement and a second illumination setting for providing a second level of accuracy that is greater than said first level of accuracy, said second illumination setting requiring more power than said first illumination setting.

2. The pointing device of claim 1 wherein said surface is characterized by a reflectivity and wherein said light level generated by said illumination system is inversely related to said reflectivity.

3. The pointing device of claim 1 wherein said illumination system comprises a laser and variable current circuit that adjusts the current flowing through said laser in response to said illumination control signal.

4. The pointing device of claim 1 wherein said illumination system comprises an LED and variable current circuit that adjusts the current flowing through said LED in response to said illumination control signal.

5. The pointing device of claim 4 wherein said variable current circuit comprises a current mirror for controlling current in said LED.

6. The pointing device of claim 1 wherein said illumination setting is at least partially determined by a control signal supplied by a user of said pointing device.

7. A method for determining the displacement of said pointing device on a surface, said method comprising:
   illuminating said surface with a light level determined by an illumination control signal;
   recording a plurality of images of said illuminated surface; and
   comparing first and second images captured at different times to determine a displacement indicative of the direction and distance said positioning device moved between said two different times, said illumination control signal depending on at least one of said recorded images;
   providing a first light level for providing a first level of accuracy in said determined displacement and a second light level for providing a second level of accuracy that is greater than said first level of accuracy, said second light level requiring more power than said first light level.

8. The method of claim 7 wherein said surface is characterized by a reflectivity and wherein said light level is inversely related to said reflectivity.

9. The method of claim 7 wherein said surface is illuminated by an LED having a bias current determined by a variable current circuit that adjusts the current flowing through said LED in response to said illumination control signal.

10. The method of claim 9 wherein said variable current circuit comprises a current mirror for controlling current in said LED.

11. The method of claim 7 wherein said light level is also at least partially determined by a control signal that is input by a user of said pointing device.

12. A pointing device comprising:
   an illumination system that illuminates a surface over which said pointing device moves, said illumination system generating a light level determined by an illumination control signal, said illumination control signal being at least partially provided by a user of said pointing device;
   a camera system that records a plurality of images of said illuminated surface; and
   a controller that records first and second images captured by said camera at different times and determines a displacement indicative of the direction and distance said positioning device moved between said two different times;
   wherein said illumination system has a first illumination setting for providing a first level of accuracy in said determined displacement and a second illumination setting for providing a second level of accuracy that is greater than said first level of accuracy, said second illumination setting requiring more power than said first illumination setting.

13. The pointing device of claim 12 wherein said illumination system comprises a laser and variable current circuit that adjusts the current flowing through said laser in response to said illumination control signal.

14. The pointing device of claim 12 wherein said illumination system comprises an LED and variable current circuit that adjusts the current flowing through said LED in response to said illumination control signal.

15. The pointing device of claim 14 wherein said variable current circuit comprises a current mirror for controlling current in said LED.

16. The pointing device of claim 12 wherein said illumination setting is at least partially determined by an analysis of the light intensity received by said camera.

17. A method for determining the displacement of said pointing device on a surface, said method comprising:
   illuminating said surface with a light level determined by an illumination control signal, said illumination control signal being at least partially provided by a user of said pointing device;
   recording a plurality of images of said illuminated surface; and
   comparing first and second images captured at different times to determine a displacement indicative of the direction and distance said positioning device moved between said two different times, said illumination control signal depending on at least one of said recorded images;
   providing a first light level for providing a first level of accuracy in said determined displacement and a second light level for providing a second level of accuracy that is greater than said first level of accuracy, said second light level requiring more power than said first light level.

18. The method of claim 17 wherein said surface is illuminated by an LED having a bias current determined by a variable current circuit that adjusts the current flowing through said LED in response to said illumination control signal.

19. The method of claim 17 wherein said variable current circuit comprises a current mirror for controlling current in said LED.

20. The method of claim 17 wherein said illumination setting is at least partially determined by an analysis of the light intensity received by said camera.

* * * * *